US012574856B2

(12) United States Patent
Cozzo et al.

(10) Patent No.: US 12,574,856 B2
(45) Date of Patent: Mar. 10, 2026

(54) UPLINK POWER CONTROL FOR DATA AND CONTROL CHANNELS

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 18/156,372

(22) Filed: Jan. 18, 2023

(65) Prior Publication Data

US 2023/0239804 A1    Jul. 27, 2023

Related U.S. Application Data

(60) Provisional application No. 63/303,806, filed on Jan. 27, 2022.

(51) Int. Cl.
*H04W 52/14*        (2009.01)
*H04L 5/00*          (2006.01)
(Continued)

(52) U.S. Cl.
CPC ......... *H04W 52/146* (2013.01); *H04L 5/0051* (2013.01); *H04W 52/54* (2013.01); *H04W 72/23* (2023.01)

(58) Field of Classification Search
CPC ... H04W 52/146; H04W 52/54; H04W 72/23; H04L 5/0051
See application file for complete search history.

(56) References Cited

U.S. PATENT DOCUMENTS

2018/0310257 A1 * 10/2018 Papasakellariou .. H04W 52/242
2019/0320457 A1 * 10/2019 Maaref ................. H04W 72/23
(Continued)

FOREIGN PATENT DOCUMENTS

WO      2020197159 A1    10/2020
WO      2020227152 A1    11/2020

OTHER PUBLICATIONS

International Search Report and Written Opinion issued Apr. 4, 2023 regarding International Application No. PCT/KR2023/001228, 8 pages.

(Continued)

*Primary Examiner* — Raymond S Dean

(57)                    ABSTRACT

Apparatuses and methods for power control for data and control channels. A method of operating a user equipment includes receiving information for a first transmission occasion for a physical uplink shared channel (PUSCH) and a second transmission occasion for a second physical uplink control channel (PUCCH) and receiving a first transmit power control (TPC) command. The method further includes determining a first power control adjustment state based on the first TPC command and a second power control adjustment state based on the first power control adjustment state. The method further includes transmitting the PUSCH in the first transmission occasion using the first power and the PUCCH in the second transmission occasion using the second power.

17 Claims, 12 Drawing Sheets

(51) Int. Cl.
  *H04W 52/54* (2009.01)
  *H04W 72/23* (2023.01)

(56) References Cited

U.S. PATENT DOCUMENTS

| | | | |
|---|---|---|---|
| 2020/0021337 A1* | 1/2020 | Wang | H04B 7/0417 |
| 2020/0037260 A1 | 1/2020 | Fu et al. | |
| 2021/0204220 A1 | 7/2021 | Zhang et al. | |
| 2021/0306987 A1 | 9/2021 | Takeda et al. | |
| 2021/0337427 A1 | 10/2021 | Takeda et al. | |
| 2022/0217654 A1* | 7/2022 | Kang | H04W 52/14 |
| 2022/0353862 A1* | 11/2022 | Cozzo | H04W 72/0473 |

OTHER PUBLICATIONS

"5G; NR; Physical channels and modulation (3GPP TS 38.211 version 17.3.0 Release 17)", ETSI TS 138 211 V17.3.0, Sep. 2022, 141 pages.

"5G; NR; Multiplexing and channel coding (3GPP TS 38.212 version 17.3.0 Release 17)", ETSI TS 138 212 V17.3.0, Sep. 2022, 206 pages.

"5G; NR; Physical layer procedures for control (3GPP TS 38.213 version 17.3.0 Release 17)", ETSI TS 138 213 V17.3.0, Sep. 2022, 262 pages.

"5G; NR; Physical layer procedures for data (3GPP TS 38.214 version 17.3.0 Release 17)", ETSI TS 138 214 V17.3.0, Sep. 2022, 237 pages.

"3rd Generation Partnership Project; Technical Specification Group Radio Access Network; NR; Medium Access Control (MAC) protocol specification (Release 17)", 3GPP TS 38.321 V17.2.0, Sep. 2022, 246 pages.

"3rd Generation Partnership Project; Technical Specification Group Radio Access Network; NR; Radio Resource Control (RRC) protocol specification (Release 17)", 3GPP TS 38.331 V17.2.0, Sep. 2022, 1298 pages.

Extended European Search Report issued Dec. 4, 2025 regarding Application No. 23747362.4, 11 pages.

* cited by examiner

1000

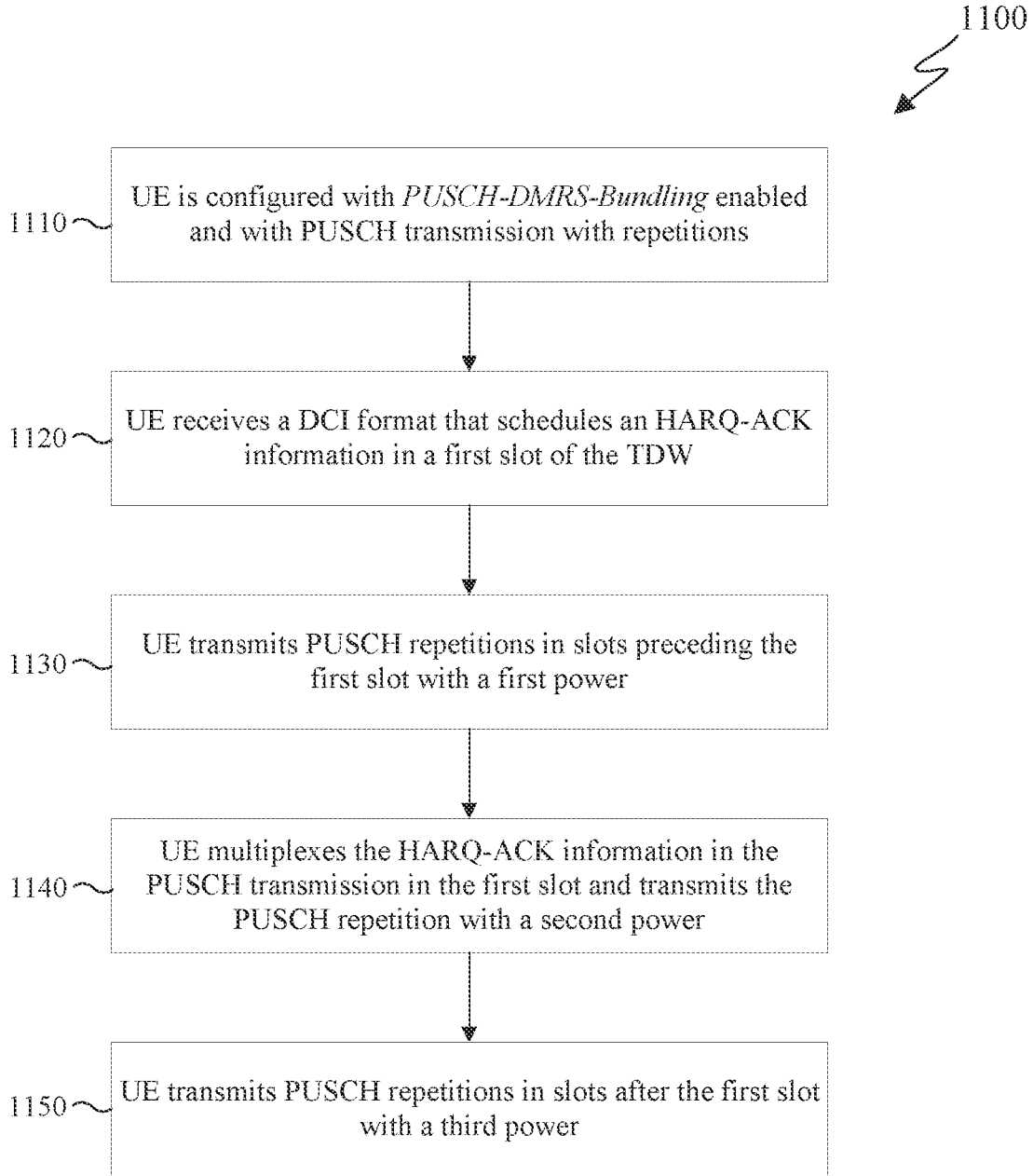

1100

1110 —
UE is configured with *PUSCH-DMRS-Bundling* enabled and with PUSCH transmission with repetitions 1120 —
UE receives a DCI format that schedules an HARQ-ACK information in a first slot of the TDW 1130 —
UE transmits PUSCH repetitions in slots preceding the first slot with a first power 1140 —
UE multiplexes the HARQ-ACK information in the PUSCH transmission in the first slot and transmits the PUSCH repetition with a second power 1150 —
UE transmits PUSCH repetitions in slots after the first slot with a third power

FIG. 11

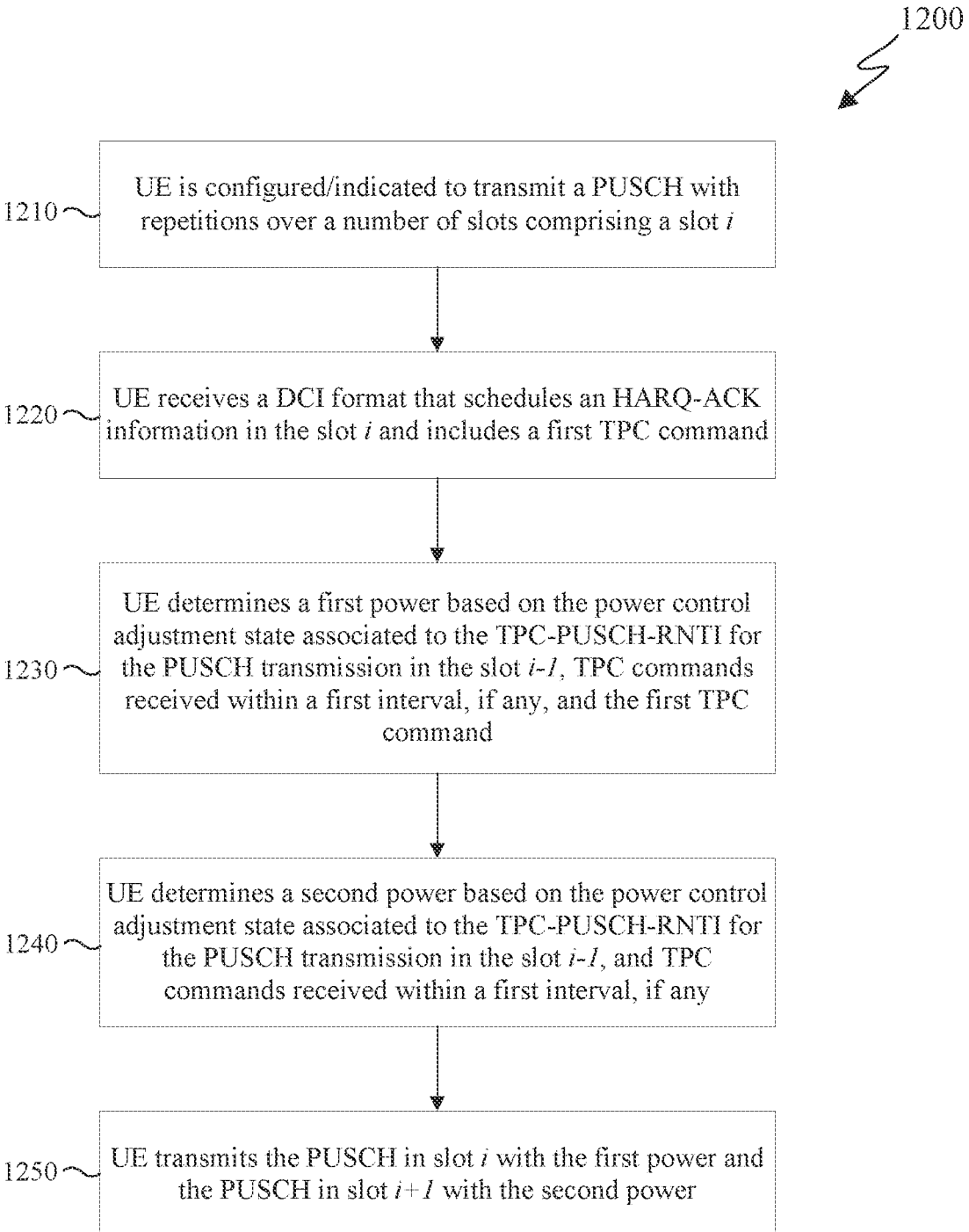

1200

1210 — UE is configured/indicated to transmit a PUSCH with repetitions over a number of slots comprising a slot $i$ 1220 — UE receives a DCI format that schedules an HARQ-ACK information in the slot $i$ and includes a first TPC command 1230 — UE determines a first power based on the power control adjustment state associated to the TPC-PUSCH-RNTI for the PUSCH transmission in the slot $i-1$, TPC commands received within a first interval, if any, and the first TPC command 1240 — UE determines a second power based on the power control adjustment state associated to the TPC-PUSCH-RNTI for the PUSCH transmission in the slot $i-1$, and TPC commands received within a first interval, if any 1250 — UE transmits the PUSCH in slot $i$ with the first power and the PUSCH in slot $i+1$ with the second power

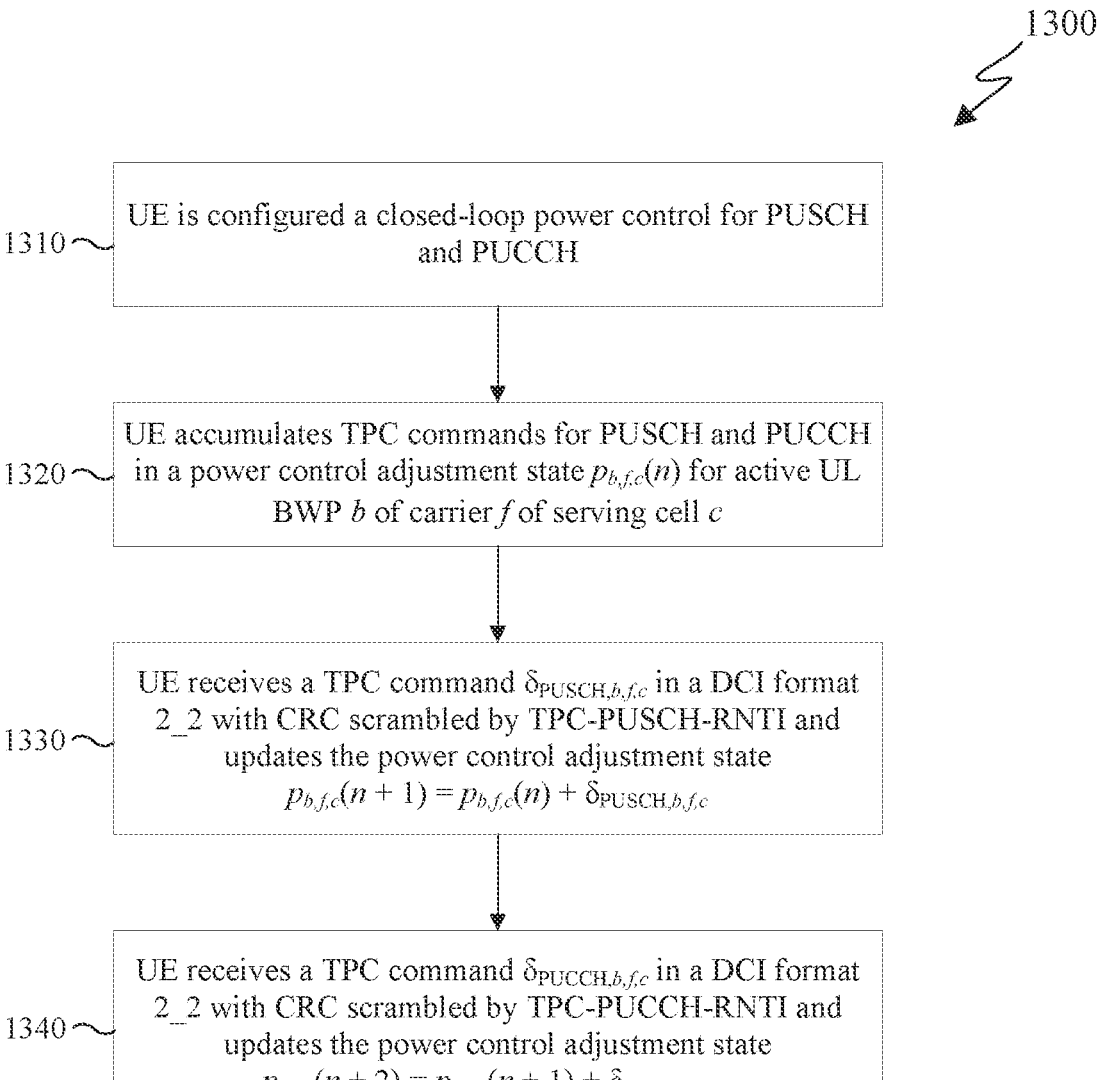

1310 — UE is configured a closed-loop power control for PUSCH and PUCCH

1320 — UE accumulates TPC commands for PUSCH and PUCCH in a power control adjustment state $p_{b,f,c}(n)$ for active UL BWP $b$ of carrier $f$ of serving cell $c$ 1330 — UE receives a TPC command $\delta_{PUSCH,b,f,c}$ in a DCI format 2_2 with CRC scrambled by TPC-PUSCH-RNTI and updates the power control adjustment state
$$p_{b,f,c}(n+1) = p_{b,f,c}(n) + \delta_{PUSCH,b,f,c}$$

1340 — UE receives a TPC command $\delta_{PUCCH,b,f,c}$ in a DCI format 2_2 with CRC scrambled by TPC-PUCCH-RNTI and updates the power control adjustment state
$$p_{b,f,c}(n+2) = p_{b,f,c}(n+1) + \delta_{PUCCH,b,f,c}$$

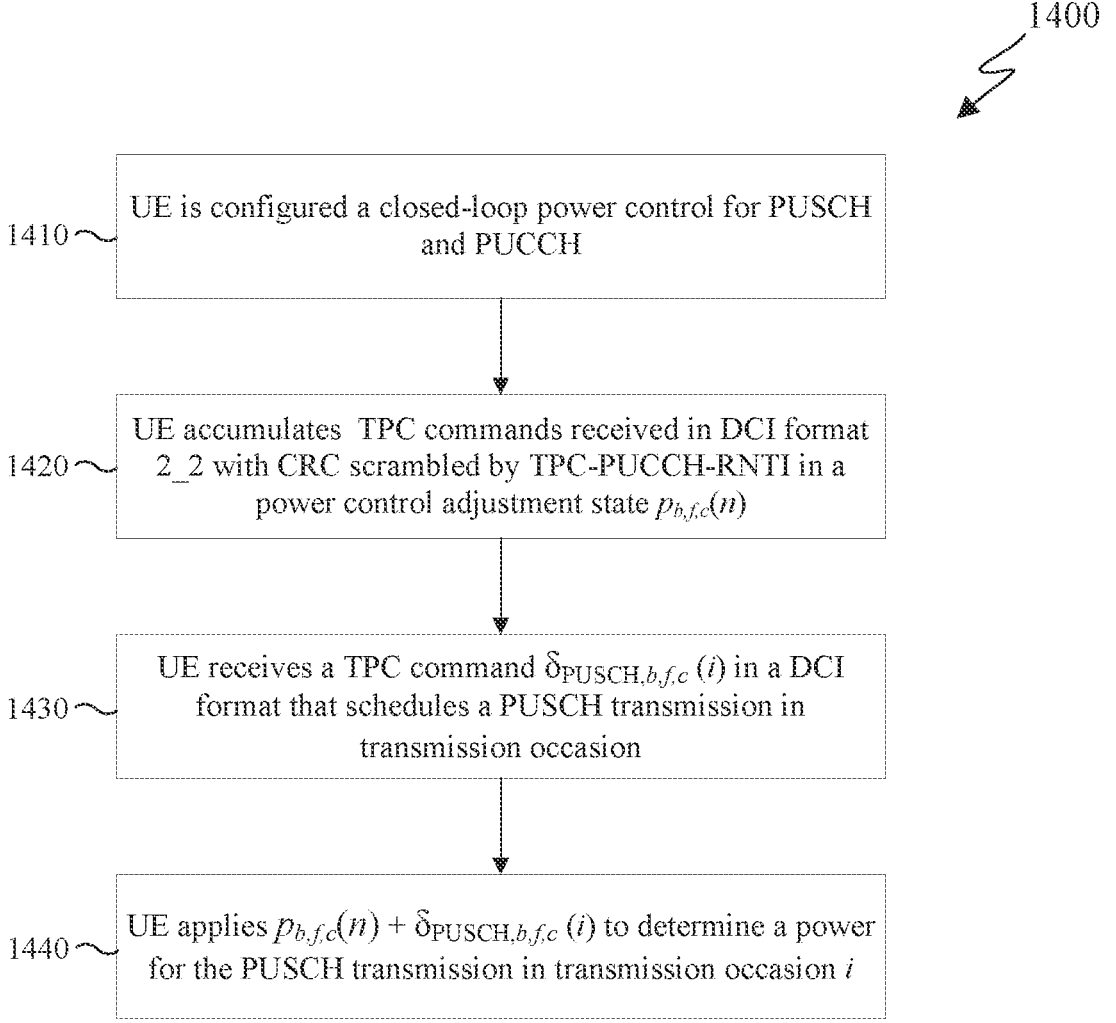

1410 — UE is configured a closed-loop power control for PUSCH and PUCCH

1420 — UE accumulates TPC commands received in DCI format 2_2 with CRC scrambled by TPC-PUCCH-RNTI in a power control adjustment state $p_{b,f,c}(n)$ 1430 — UE receives a TPC command $\delta_{PUSCH,b,f,c}(i)$ in a DCI format that schedules a PUSCH transmission in transmission occasion 1440 — UE applies $p_{b,f,c}(n) + \delta_{PUSCH,b,f,c}(i)$ to determine a power for the PUSCH transmission in transmission occasion $i$

FIG. 14

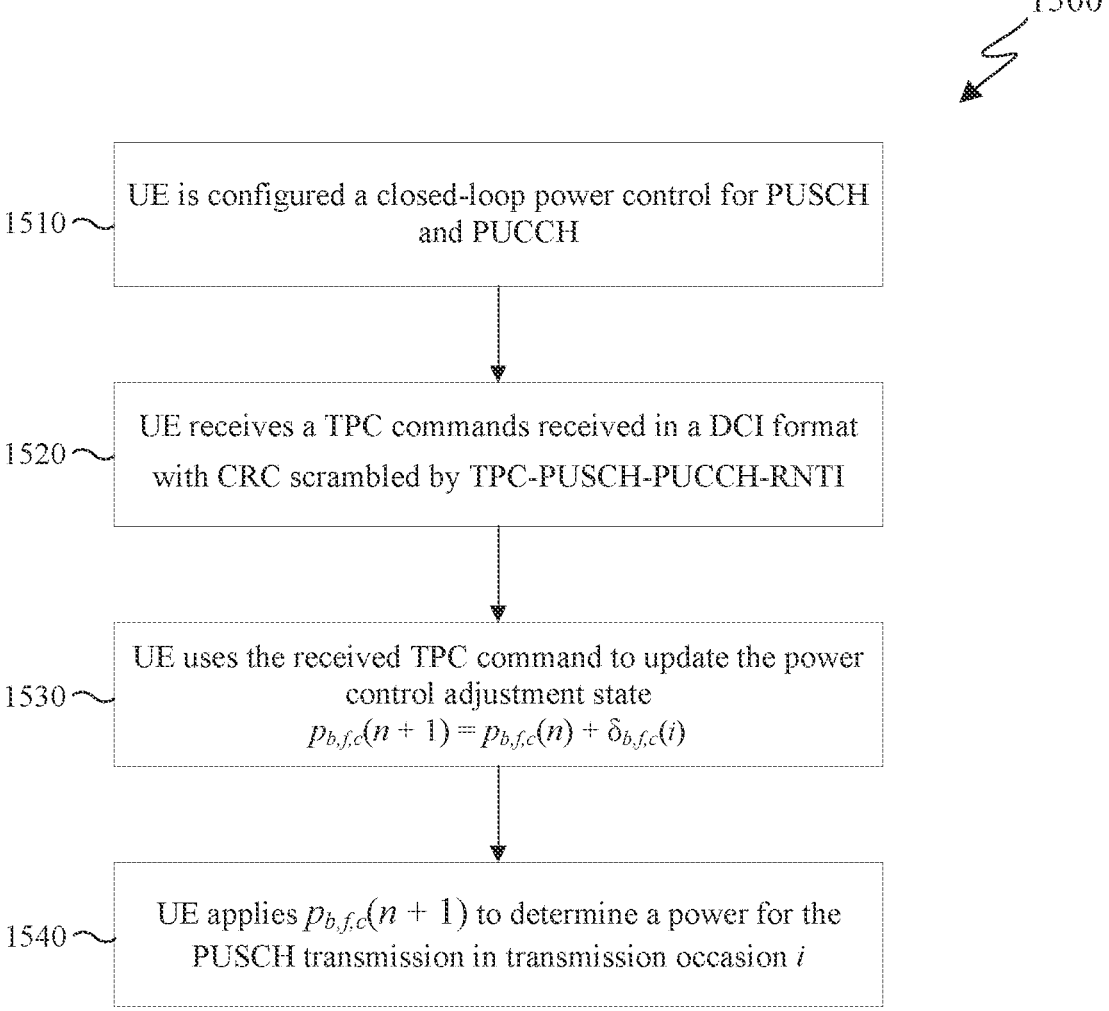

1500

1510 — UE is configured a closed-loop power control for PUSCH and PUCCH

1520 — UE receives a TPC commands received in a DCI format with CRC scrambled by TPC-PUSCH-PUCCH-RNTI 1530 — UE uses the received TPC command to update the power control adjustment state
$$p_{b,f,c}(n + 1) = p_{b,f,c}(n) + \delta_{b,f,c}(i)$$

1540 — UE applies $p_{b,f,c}(n + 1)$ to determine a power for the PUSCH transmission in transmission occasion $i$

FIG. 15

UPLINK POWER CONTROL FOR DATA AND CONTROL CHANNELS

CROSS-REFERENCE TO RELATED APPLICATION AND CLAIM OF PRIORITY

This application claims priority under 35 U.S.C. § 119(e) to U.S. Provisional Patent Application No. 63/303,806 filed on Jan. 27, 2022. The above-identified provisional patent application is hereby incorporated by reference in its entirety.

TECHNICAL FIELD

The present disclosure relates generally to wireless communication systems and, more specifically, to power control for data and control channels.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for power control for data and control channels.

In one embodiment, a user equipment (UE) is provided. The UE includes a transceiver configured to receive information for a first transmission occasion for a physical uplink shared channel (PUSCH) and a second transmission occasion for a physical uplink control channel (PUCCH) and receive a first transmit power control (TPC) command. The UE further includes a processor operably coupled to the transceiver. The processor is configured to determine a first power control adjustment state associated with the first transmission occasion, based on the first TPC command, and a second power control adjustment state associated with the second transmission occasion, based on the first power control adjustment state. The transceiver is further configured to transmit the PUSCH in the first transmission occasion using the first power and the PUCCH in the second transmission occasion using the second power.

In another embodiment, a base station (BS) is provided. The BS includes a transceiver configured to transmit information for a first reception occasion for a PUSCH and a second reception occasion for a PUCCH and transmit a first TPC command. The BS further includes a processor operably coupled to the transceiver. The processor is configured to determine a first power control adjustment state associated with the first reception occasion, based on the first TPC command, and a second power control adjustment state associated with the second reception occasion, based on the first power control adjustment state. The transceiver is further configured to receive the PUSCH in the first reception occasion using the first power and the PUCCH in the second reception occasion using the second power.

2

In yet another embodiment, a method is provided. The method includes receiving information for a first transmission occasion for a physical uplink shared channel (PUSCH) and a second transmission occasion for a PUCCH and receiving a first TPC command. The method further includes determining a first power control adjustment state associated with the first transmission occasion, based on the first TPC command, and a second power control adjustment state associated with the second transmission occasion, based on the first power control adjustment state. The method further includes transmitting the PUSCH in the first transmission occasion using the first power and the PUCCH in the second transmission occasion using the second power.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example method for a UE to determine a power for a physical uplink shared channel (PUSCH) transmission when the UE is configured with DM-RS bundling operation and multiplexes hybrid automatic repeat request acknowledgement (HARQ-ACK) information in a PUSCH repetition according to embodiments of the present disclosure;

FIG. 12 illustrates an example method for a UE to determine a power for a PUSCH transmission when the UE multiplexes an HARQ-ACK information in a PUSCH repetition according to embodiments of the present disclosure;

FIG. 13 illustrates an example method for a UE to determine a closed-loop power control adjustment state according to embodiments of the present disclosure;

FIG. 14 illustrates an example method for a UE to determine a power for transmission of a PUSCH based on a joint closed-loop power control for PUSCH and physical uplink control channel (PUCCH) according to embodiments of the present disclosure; and FIG. 15 illustrates an example method for a UE to determine a power for transmission of a PUCCH based on a joint closed-loop power control for PUSCH and PUCCH according to embodiments of the present disclosure.

DETAILED DESCRIPTION

Figure 1:
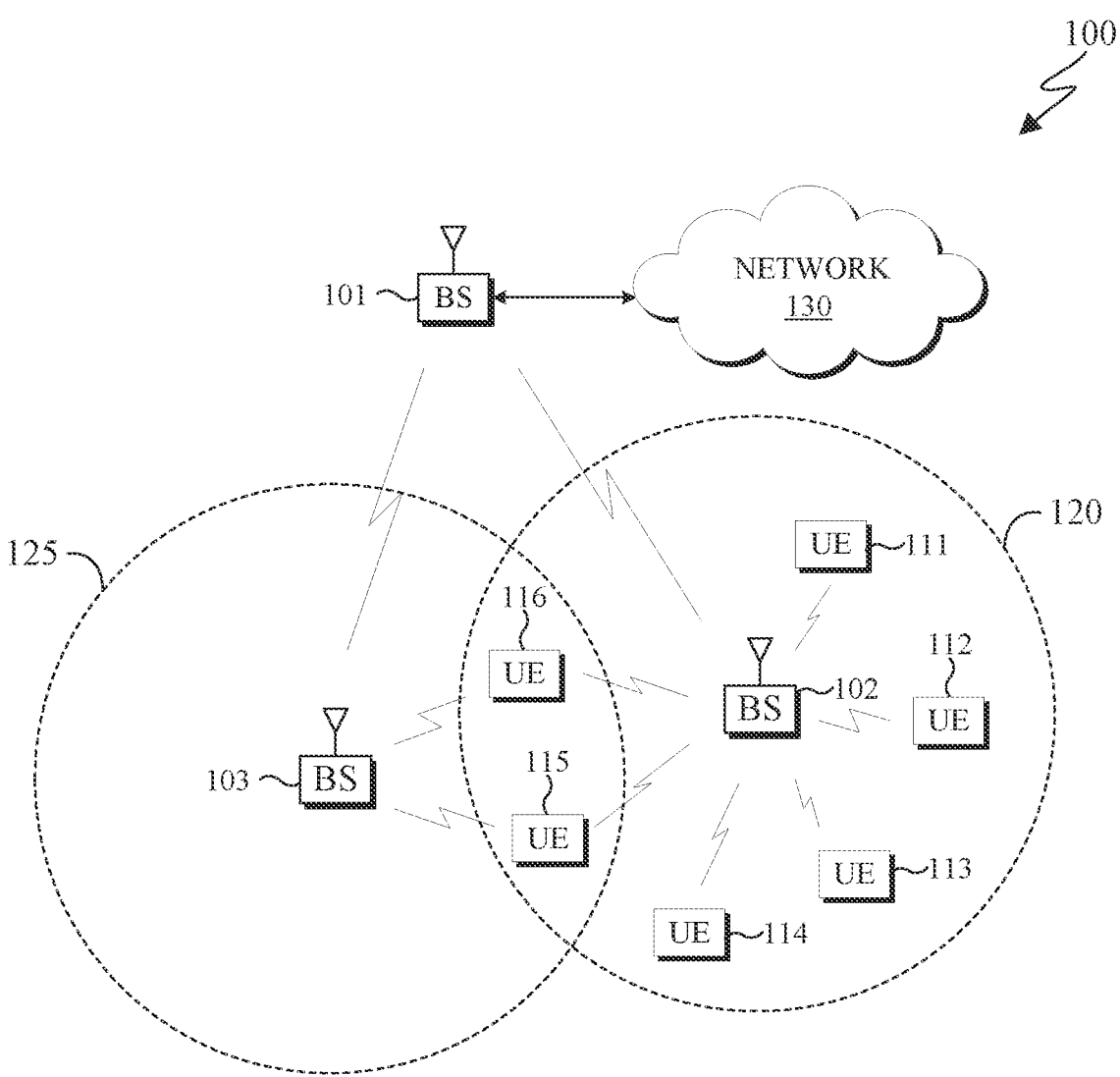
FIG. 1 illustrates an example wireless network according to embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.3.0, "NR; Physical channels and modulation" ("REF1"); 3GPP TS 38.212 v17.3.0, "NR; Multiplexing and channel coding" ("REF2"); 3GPP TS 38.213 v17.3.0, "NR; Physical layer procedures for control" ("REF3"); 3GPP TS 38.214 v17.3.0, "NR; Physical layer procedures for data" ("REF4"); 3GPP TS 38.321 v17.2.0, "NR; Medium Access Control (MAC) protocol specification" ("REF5"); and 3GPP TS 38.331 v17.2.0, "NR; Radio Resource Control (RRC) protocol specification" ("REF6").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
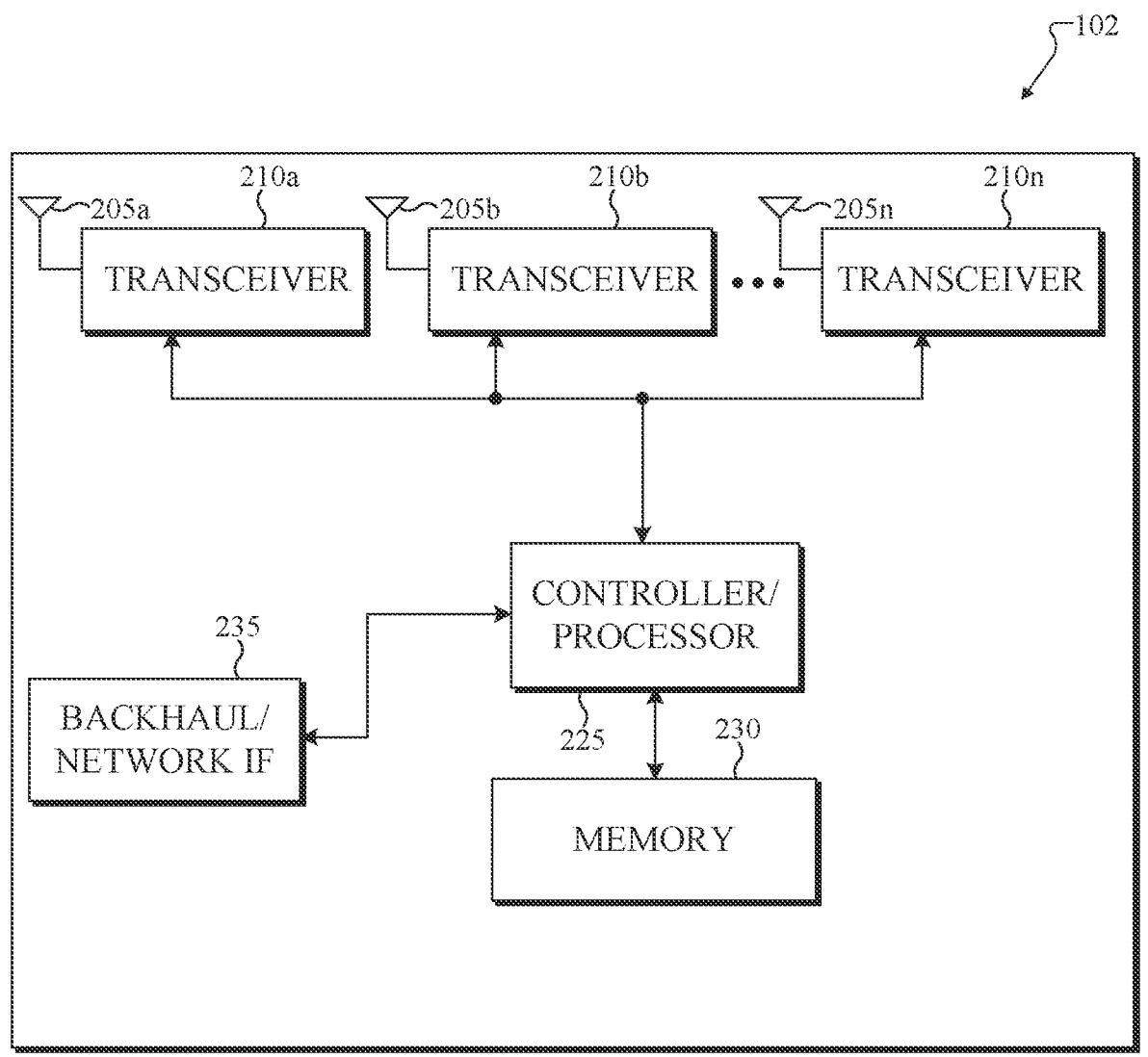
FIG. 2 illustrates an example gNB according to embodiments of the present disclosure.
Figure 3:
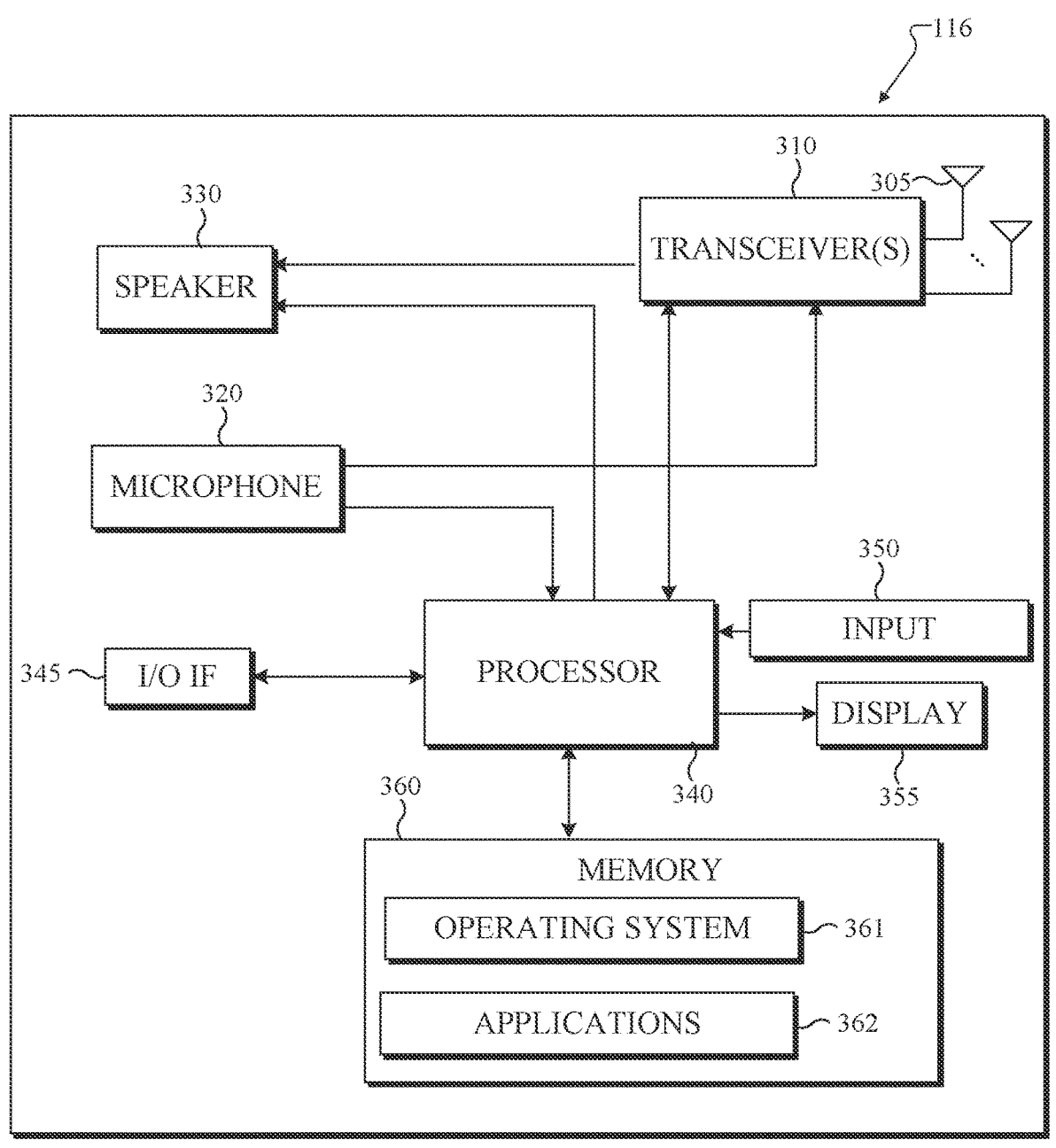
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for triggering power control for data and control channels. In certain embodiments, one or more of the BSs 101-103 include circuitry, programing, or a combination thereof for triggering power control for data and control channels.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for uplink transmission in full duplex systems. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
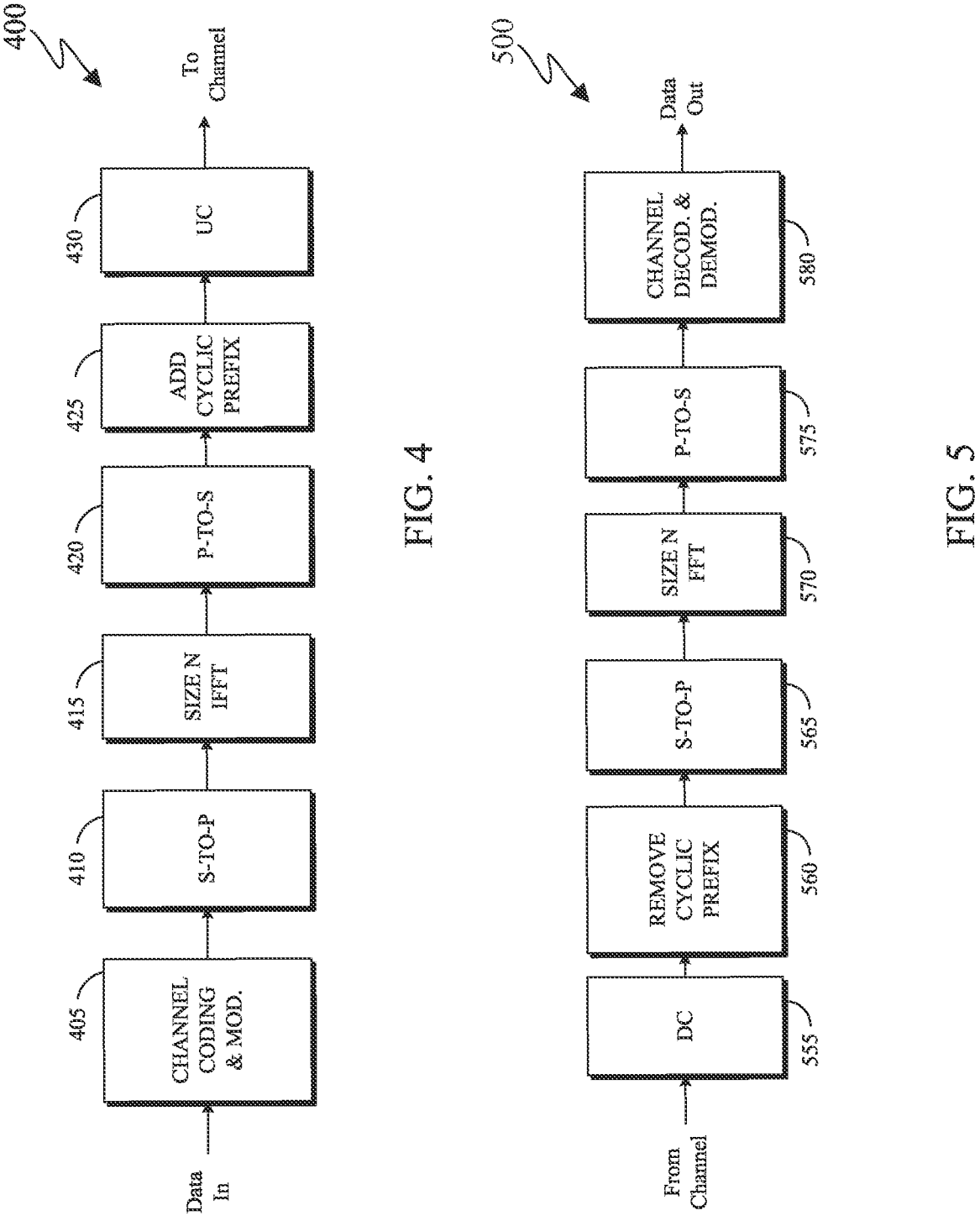
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support triggering power control for data and control channels as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^\mu \cdot 15$ kHz. A unit of one sub-carrier over one symbol is referred to as resource element (RE). A unit of one RB over one symbol is referred to as physical RB (PRB).

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A PDCCH transmission is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception and a redundancy version (RV) that is indicated by a RV field in the DCI format when incremental redundancy is used for encoding the TB. A TB transmission can be an initial one or a retransmission as identified by a new data indicator (NDI) field in the DCI format scheduling a PDSCH reception that provides a TB retransmission for a given HARQ process number.

A gNB transmits one or more of multiple types of RS including channel state information RS (CSI-RS) and demodulation RS (DM-RS)—see also REF 1. A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF 3). The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB (see also REF 5). A DM-RS is typically transmitted only within a BW of a respective PDCCH or PDSCH and a UE can use the DM-RS to demodulate data or control information.

A UE typically monitors multiple candidate locations for respective potential PDCCH receptions to decode multiple DCI formats in a slot, for example as described in REF 3. A DCI format includes cyclic redundancy check (CRC) bits in order for the UE to confirm a correct detection of the DCI format. A DCI format type is identified by a radio network temporary identifier (RNTI) that scrambles the CRC bits (see also REF 2).

For a DCI format scheduling a PDSCH or a PUSCH to a single UE, the RNTI can be a cell RNTI (C-RNTI), or a configured scheduling RNTI (CS-RNTI), or an MCS-C-RNTI and serves as a UE identifier. In the following, for brevity, only the C-RNTI will be referred to when needed. A UE typically receives/monitors PDCCH for detections of DCI formats with CRC scrambled by a C-RNTI according to a UE-specific search space (USS). For a DCI format 0_0 and a DCI format 1_0 that schedule PUSCH transmissions and PDSCH receptions, respectively, to a UE, the UE can additionally be configured to monitor corresponding PDCCH according to common search space (CSS). For a DCI format 0_1 and a DCI format 0_2 that are mainly used to schedule PUSCH transmissions or for a DCI format 1_1 and a DCI format 1_2 that are mainly used to schedule PDSCH receptions, the UE monitors corresponding PDCCH according to a USS. PDCCH monitoring implies reception of PDCCH candidates and decoding of potential DCI formats.

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell. Such DCI formats include a DCI format 2_0 providing a structure of a slot in term of DL, UL or flexible/reserved symbols over a number of slots, a DCI format 2_2 providing transmit power control (TPC) commands for PUSCH or PUCCH transmissions, a DCI format 2_3 providing TPC commands for SRS transmissions and also potentially triggering a SRS transmission on a number of cells, and so on, and a corresponding CSS is referred to as Type3-PDCCH CSS.

UL signals also include data signals conveying information content, control signals conveying UL control information (UCI), DM-RS associated with data or UCI demodulation, phase-tracking RS (PT-RS) used for phase tracking in symbols of a PUSCH, and sounding RS (SRS) enabling a gNB to perform UL channel measurement, and a random access (RA) preamble enabling a UE to perform random access (see also REF 1). A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UL RS includes DM-RS, PT-RS, and SRS. DM-RS is typically transmitted within a BW of a respective PUSCH or PUCCH. A gNB can use a DM-RS to demodulate information in a respective PUSCH or PUCCH. SRS is transmitted by a UE to provide a gNB with an UL CSI and, for a TDD system, to also provide a PMI for DL transmission. Further, as part of a random access procedure or for other purposes, a UE can transmit a physical random access channel (PRACH).

UCI includes hybrid automatic repeat request acknowledgement (HARQ-ACK) information, indicating correct or incorrect decoding of TBs or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE transmits a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value.

DL receptions and UL transmissions by a UE can be configured to occur in a corresponding DL bandwidth part (BWP) and UL BWP. A DL/UL BWP is smaller than or equal to a DL/UL bandwidth of a serving cell. DL transmissions from a gNB and UL transmissions from a UE can be based on an orthogonal frequency division multiplexing (OFDM) waveform including a variant using DFT precoding that is known as DFT-spread-OFDM (see also REF 1).

Figures 6, 7:
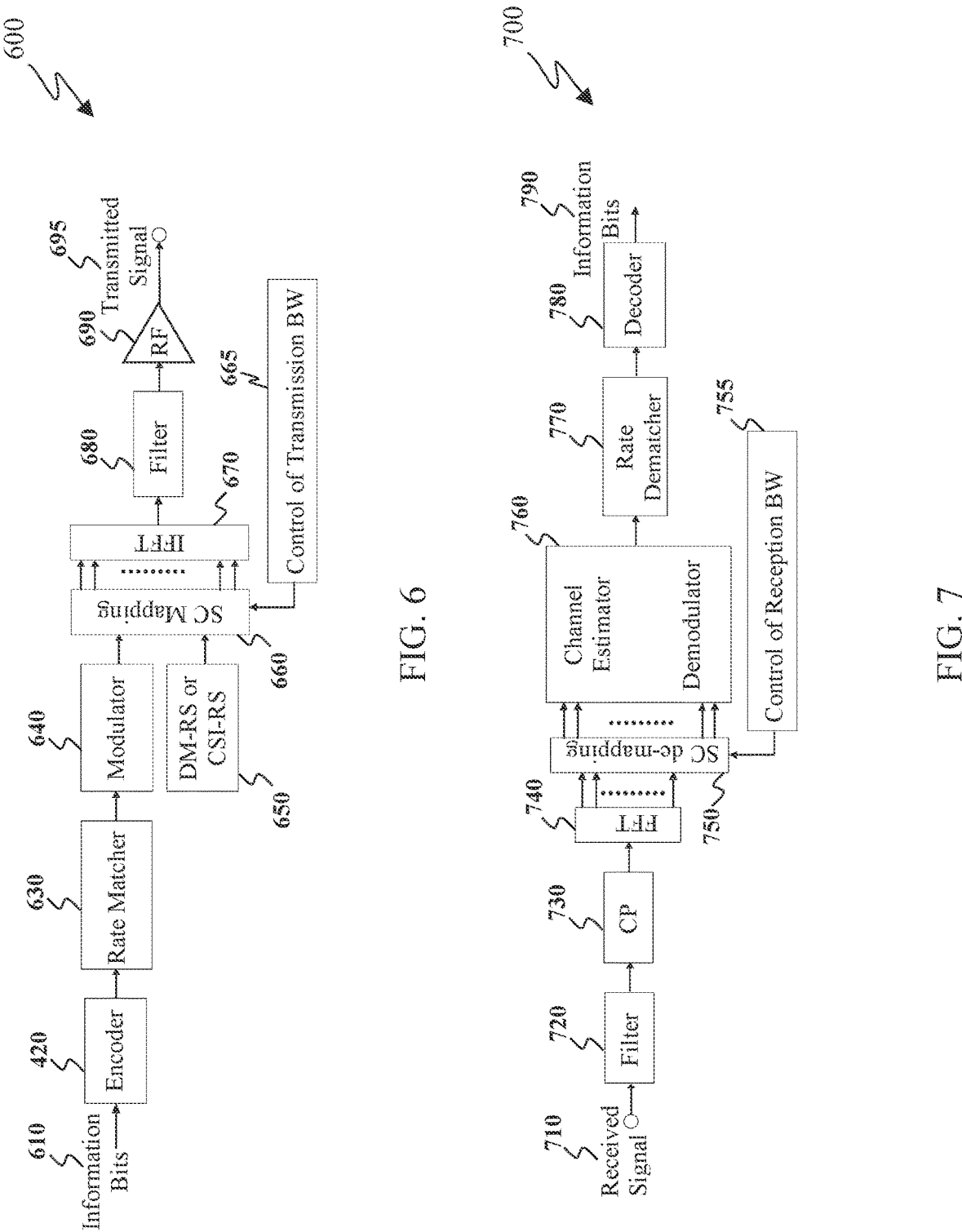
FIG. 6 illustrates a transmitter block diagram for a transmitter using orthogonal frequency division multiplexing (OFDM) according to embodiments of the present disclosure.
FIG. 7 illustrates a receiver block diagram for a receiver using OFDM according to embodiments of the present disclosure.

FIG. 6 illustrates a transmitter block diagram 600 for a transmitter using OFDM according to embodiments of the present disclosure. The embodiment of the transmitter block diagram 600 for a transmitter using OFDM illustrated in FIG. 6 is for illustration only. FIG. 6 does not limit the scope of this disclosure to any particular implementation of the transmitter block diagram.

Information bits, such as DCI bits or data bits 610, are encoded by encoder 620, rate matched to assigned time/frequency resources by rate matcher 630, and modulated by modulator 640. Subsequently, modulated encoded symbols and DM-RS or CSI-RS 650 are mapped to SCs 660 by SC mapping unit 665, an inverse fast Fourier transform (IFFT) is performed by filter 670, a cyclic prefix (CP) is added by CP insertion unit 680, and a resulting signal is filtered by filter 690 and transmitted by a radio frequency (RF) unit 695.

FIG. 7 illustrates a receiver block diagram 700 for a receiver using OFDM according to embodiments of the present disclosure. The embodiment of the receiver block diagram 700 for a receiver using OFDM illustrated in FIG. 7 is for illustration only. FIG. 7 does not limit the scope of this disclosure to any particular implementation of the receiver block diagram.

A received signal 710 is filtered by filter 720, a CP removal unit removes a CP 730, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

A UE multiplexes HARQ-ACK information in a PUCCH that the UE transmits in a slot indicated by a value of PDSCH-to-HARQ_feedback timing indicator field in a last DCI format associated with the HARQ-ACK information, from a set of slot timing values $K_1$, or indicated by higher layers in case of a SPS PDSCH reception as described in REF 3. When a UE has received a configuration of PUCCH resource sets, the UE determines a PUCCH resource set based on a UCI payload to multiplex in a PUCCH and determines a PUSCH resource within the PUCCH resource set based on a PUCCH resource index (PRI) in the DCI format.

A UE can also multiplex UCI in a PUSCH transmission. Then, a UE determines a number of UCI coded modulation symbols based on a number of UCI information bits, a spectral efficiency (or MCS) of the PUSCH transmission, and a scaling factor $\beta_{offset}^{PUSCH}$ as described in REF 2. Among the REs available for UCI multiplexing in a PUSCH, such as all REs excluding REs in symbols prior to a first symbol with DM-RS REs or in symbols with DM-RS REs or excluding PT-RS REs, the UE can also be provided by higher layers a parameter a that limits a number of available REs that can be used for UCI multiplexing in a PUSCH as described in REF 2. When the number of HARQ-ACK information bits is less than or equal to 2, a number of resource elements (REs) are reserved in the PUSCH for HARQ-ACK multiplexing, in order to avoid error events where a gNB expects HARQ-ACK information to be multiplexed in the PUSCH but the UE fails to detect an associated DCI format, and data information symbols that would be multiplexed in the reserved REs are punctured. When the number of HARQ-ACK information bits is larger than 2, rate matching is used between data information symbols and HARQ-ACK information symbols. For CSI multiplexing in a PUSCH, CSI symbols are placed at a first PUSCH symbol that is not used for DM-RS multiplexing in the PUSCH.

A UE does not expect to multiplex in a PUSCH transmission, or in a PUCCH transmission, HARQ-ACK information that the UE would transmit in different PUCCHs to a same transmission reception point (TRP). For multiplexing of HARQ-ACK information in a PUSCH, coded modulation HARQ-ACK symbols are placed after a first symbol of the PUSCH that is used for DM-RS multiplexing or after the first consecutive DM-RS symbols. The multiplexing operation depends on a number of HARQ-ACK information bits. When a PUSCH is transmitted with frequency hopping, the above multiplexing of UCI symbols applies in each hop.

A UE includes a demodulation reference signal (DM-RS) in a physical uplink data channel (PUSCH) or in a physical uplink control channel (PUCCH) transmission in order to enable a receiver at a serving gNB to coherently demodulate modulated data information symbols or control information symbols in the PUSCH or in the PUCCH, respectively. The DM-RS is typically located in the earlier symbols of a PUSCH or PUCCH transmission to avoid a demodulation delay due to a processing time for obtaining a channel estimate to be used for the coherent demodulation of data/control symbols under the assumption of phase coherence among the DM-RS and the data/control symbols.

Inaccurate channel estimation can significantly degrade reception reliability of data/control information. A way to improve an accuracy of channel estimates is to filter multiple DM-RS across slots of an uplink transmission. In order to enable filtering over multiple DM-RS, a power and phase of the filtered DM-RS needs to remain practically same and that also applies to the power and phase of modulated data/control information symbols, for example in case of QAM modulation, in order to perform demodulation using the filtered DM-RS. Thus, when a UE is scheduled to transmit a PUSCH with repetitions over a number of slots, the conditions that the UE should apply when filtering over multiple DM-RS include for the UE to maintain a same transmit power, a same spatial filtering and a same precoding for the repetitions.

PUSCH repetitions can be transmitted in consecutive or non-consecutive slots depending on the availability of time-frequency resources in some slots which can depend on a slot not including enough consecutive UL symbols for a PUSCH or PUCCH repetition, or not being available for UL transmission by configuration or by means of a dynamic indication such as scheduling of a higher priority transmission, indication of a cancellation or indication of a slot as DL slot.

A UE can operate in both TDD and FDD modes, and can be configured for operation with DM-RS bundling in both modes. A UE can also operate in half-duplex frequency division duplex (HD-FDD) mode and be configured for operation with DM-RS bundling. Similar to TDD, an HD-FDD UE cannot transmit and receive at the same time and within a TDW the UE transmits with a same power, phase, and spatial filter to enable DM-RS filtering over multiple DM-RS receptions at a serving gNB.

Embodiments for determining a power for a PUSCH transmission with repetitions described for the PUSCH transmission in a transmission occasion within a TDW for DM-RS bundling operation equally apply to any PUSCH transmission in any transmission occasion within the TDW. Additionally, embodiments for determining the power of a PUSCH transmission with a multiplexed HARQ-ACK information in a PUSCH transmission occasion (i) and the power of a PUSCH transmission in a subsequent PUSCH transmission occasion (i+n) equally apply when DMRS bundling is enabled or not enabled. Embodiments for determining the power of the PUSCH transmission described for DM-RS bundling operation equally apply when the UE is configured to maintain a joint closed-loop power control adjustment state for more than one channel or signal, for example the joint closed-loop power control adjustment state for PUSCH and PUCCH.

Figure 8:
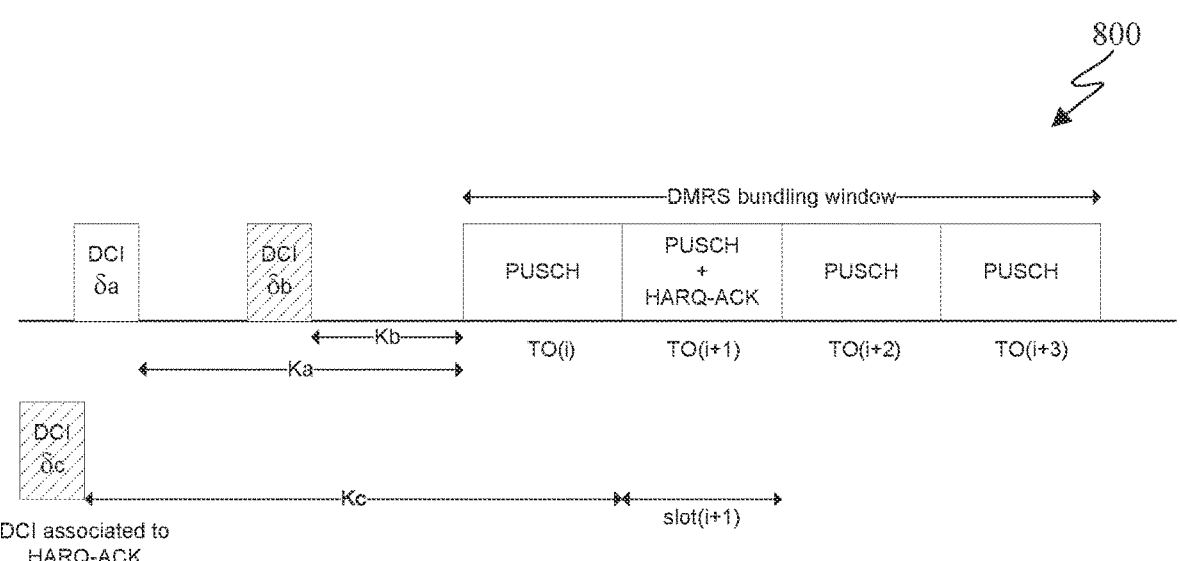
FIG. 8 illustrates an example of a UE configured for operation with demodulation reference signal (DM-RS) bundling according to embodiments of the present disclosure.

FIG. 8 illustrates an example of a UE configured for operation with DM-RS bundling 800 according to embodiments of the present disclosure. The embodiment of the UE configured for operation with DM-RS bundling 800 illustrated in FIG. 8 is for illustration only. FIG. 8 does not limit the scope of this disclosure to any particular implementation of the UE configured for operation with DM-RS bundling.

Figure 9:
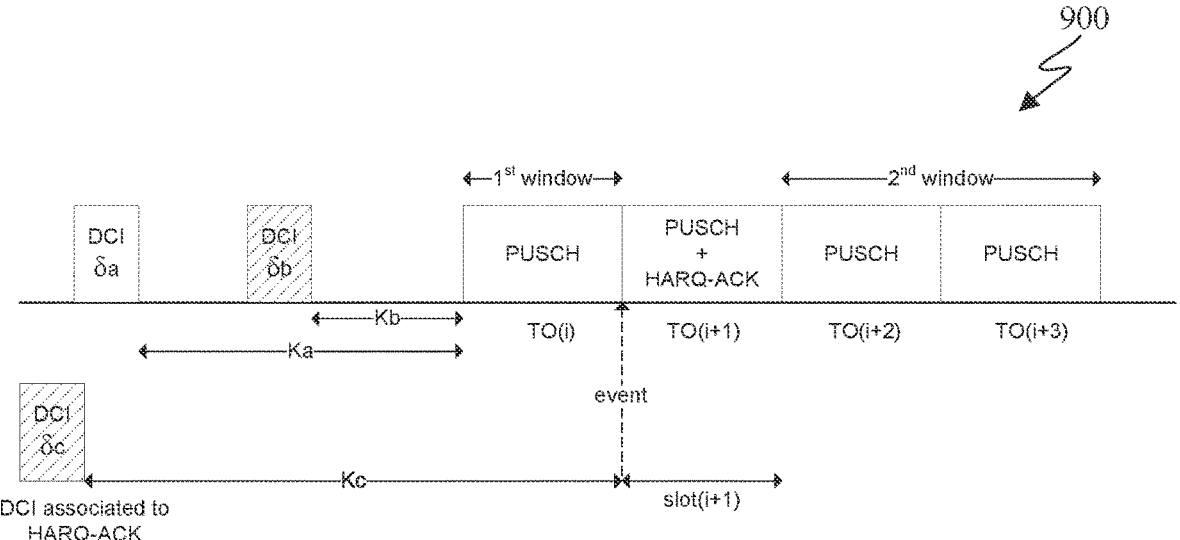
FIG. 9 illustrates another example of a UE configured for operation with DM-RS bundling according to embodiments of the present disclosure.

FIG. 9 illustrates another example of a UE configured for operation with DM-RS bundling 900 according to embodiments of the present disclosure. The embodiment of the UE configured for operation with DM-RS bundling 900 illustrated in FIG. 9 is for illustration only. FIG. 9 does not limit the scope of this disclosure to any particular implementation of the UE configured for operation with DM-RS bundling.

Figure 10:
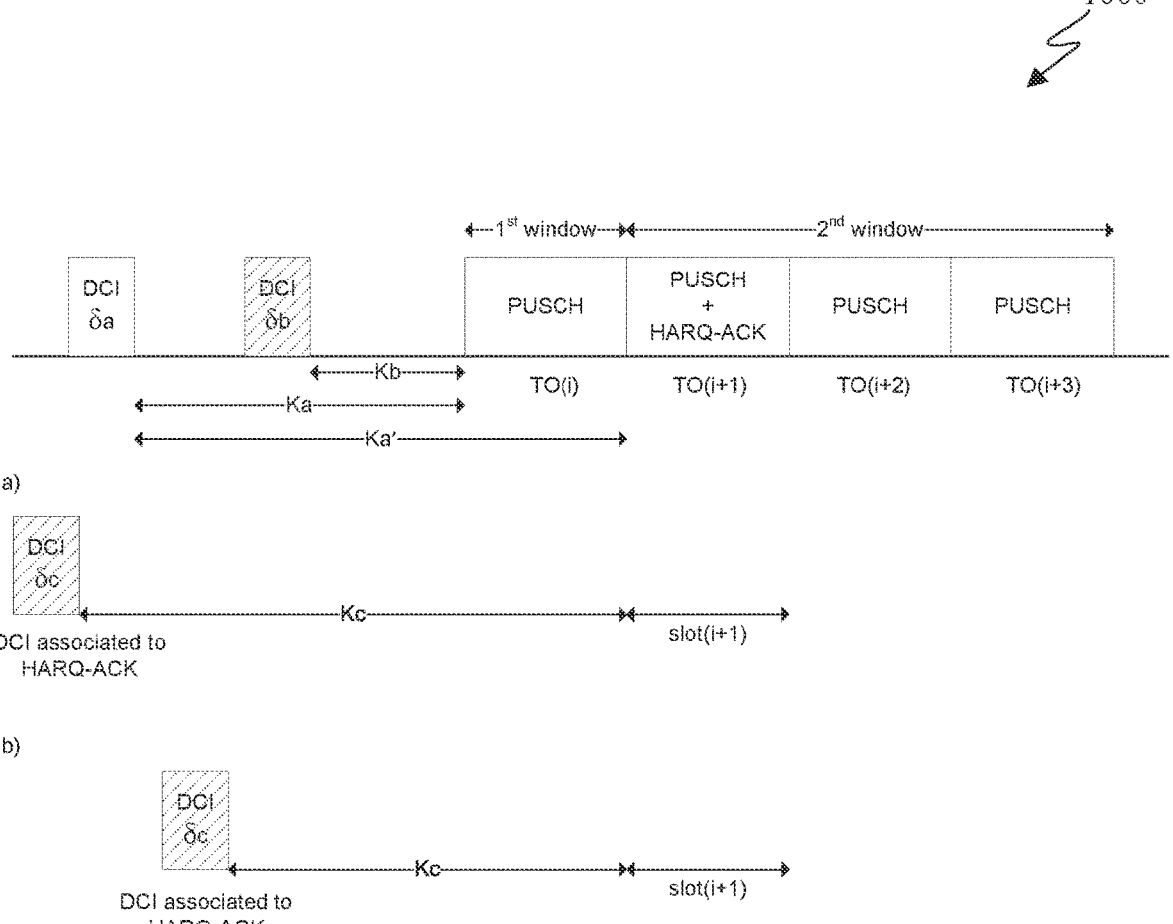
FIG. 10 illustrates yet another example of a UE configured for operation with DM-RS bundling according to embodiments of the present disclosure.

FIG. 10 illustrates yet another example of a UE configured for operation with DM-RS bundling 1000 according to embodiments of the present disclosure. The embodiment of the UE configured for operation with DM-RS bundling 1000 illustrated in FIG. 10 is for illustration only. FIG. 10 does not limit the scope of this disclosure to any particular implementation of the UE configured for operation with DM-RS bundling.

For PUSCH transmissions of PUSCH repetition Type A scheduled by DCI format 0_1 or 0_2, PUSCH repetition Type A with a configured grant, PUSCH repetition Type B and TB processing over multiple slots, when PUSCH-DMRS-Bundling is enabled, and for PUCCH transmissions of PUCCH repetition, when PUCCH-DMRS-Bundling is enabled, the UE determines one or multiple time domain windows (TDWs) and transmits the PUSCH transmissions or PUCCH transmissions within a window with a same power.

When a UE is configured for operation with DM-RS bundling with a TDW of length L and is configured/indicated to transmit a first PUSCH with L repetitions in slots n=1, . . . , L, the UE determines the transmit power of the PUSCH repetitions within the TDW based on a TPC command received in a DCI format associated with the PUSCH transmission, if any, and on TPC commands received in a DCI format 2_2 with CRC scrambled by TPC-PUSCH-RNTI, if any, within a time interval. The UE transmits the PUSCH repetitions within the TDW with the same power and accumulates TPC commands received in a DCI format 2_2 with CRC scrambled by TPC-PUSCH-RNTI during the TDW, updates a corresponding closed-loop power control adjustment state and applies the updated adjustment state to determine the power for a transmission after the TDW or for transmissions within a subsequent TDW. For example, as illustrated in FIG. 8, a UE is configured with PUCCH-DMRS-Bundling enabled and a TDW length is 4 slots. The UE is also scheduled by a DCI format to transmit PUSCH with 4 repetitions in the 4 transmission occasions (TOs) {i, i+1, i+2, i+3}, wherein the DCI format includes a TPC command $\delta_a$. If the UE is not provided tpc-Accumulation, the UE updates a PUSCH power control adjustment state with TPC command values received within an interval $K_a$ prior to the first symbol of the first PUSCH transmission in TO(i), applies the updated adjustment state to determine the power for the PUSCH transmission in TO(i) and transmit the PUSCH repetitions in the 4 TOs {i, i+1, i+2, i+3} with the same power. Subject to a condition on an interval value $K_b$ between the reception of a DCI format 2_2 with CRC scrambled by TPC-PUSCH-RNTI that includes a TPC command $\delta_b$, the TPC command $\delta_b$ may or may not be included in the accumulated closed-loop power control adjustment state associated to the TPC-PUSCH-RNTI. It is also possible that the PUSCH transmission with repetitions is not associated to a DCI format scheduling the PUSCH transmission and including a TPC command, and the transmit power of the PUSCH repetitions within the TDW is determined from the corresponding closed-loop power control adjustment state. The UE can also be scheduled or configured to transmit an HARQ-ACK information in a slot where a PUSCH repetition is also scheduled or configured, wherein the slot is indicated by a value of PDSCH-to-HARQ_feedback timing indicator field in a last DCI format associated with the HARQ-ACK information. The HARQ-ACK information can be associated to a DCI format that includes a TPC command. In the example of FIG. 8, the HARQ-ACK information is scheduled by a DCI format that includes a TPC command $\delta_c$ in slot (i+1) where a second repetition of the PUSCH is scheduled in TO(i+1).

In one embodiment the UE multiplexes the HARQ-ACK information in the PUSCH in TO(i+1), and transmits the HARQ-ACK information with same power as the power of PUSCH repetition in TO(i+1) that is determined based on a corresponding closed-loop power control adjustment state for PUSCH. The DM-RS bundling is performed on the TDW of 4 slots and transmissions in all 4 slots are with the same power.

In another embodiment a reception of an indication to transmit an HARQ-ACK information in a slot (i+1), wherein the indication is by a PDSCH-to-HARQ_feedback timing indicator field in a last DCI format associated with the HARQ-ACK information and the slot (i+1) is a slot within a TDW for DMRS bundling of PUSCH repetitions, is an event that interrupts the nominal TDW, as illustrated in FIG. 9. The UE multiplexes the HARQ-ACK information in a PUSCH transmission in slot (i+1), determines a power for the PUSCH transmission in slot (i+1), and transmits the PUSCH with the determined power in slot (i+1). For the remaining PUSCH repetitions in slots (i+2) and slot (i+3) a new DM-RS bundle may or may not be formed subject to a configuration and/or a UE capability of restarting DMRS bundling after an event.

In the example of FIG. 9, it is assumed that $f_{b,f,c}(i-i_0)$ is the PUSCH power control adjustment state for active UL BWP b of carrier f of serving cell c in a PUSCH transmission occasion $i-i_0$ preceding the reception of the DCI format that schedules the PUSCH transmission with repetitions and $f_{b,f,c}(i+1)$ is the PUSCH power control adjustment state for the PUSCH transmission occasion i+1 which is determined by adding $f_{b,f,c}(i-i_0)$, the TPC command $\delta_a$ received in a DCI format that schedules the PUSCH transmission with repetitions, and the TPC command $\delta_b$ that is received in a DCI format 2_2 with CRC scrambled by TPC-PUCCH-RNTI. Thus, the PUSCH power control adjustment state for the PUSCH transmission occasion i+1 is $f_{b,f,c}(i+1)=f_{b,f,c}(i-i_0)+\delta_a+\delta_b$.

In slot (i+1) the UE multiplexes the HARQ-ACK information in the PUSCH transmission of a second PUSCH repetition and can transmit the PUSCH in the PUSCH transmission occasion (i+1) with a power determined by the accumulated closed-loop power control adjustment state associated to the TPC-PUSCH-RNTI for the PUSCH transmission occasion (i+1) and by the TPC command received in a DCI format associated to the HARQ-ACK information. The UE applies a power control adjustment state $f_{b,f,c}(i+1)=f_{b,f,c}(i)+\delta_c$ to determine the power of the PUSCH transmission in the PUSCH transmission occasion (i+1) but does not update the PUSCH power control adjustment state $f_{b,f,c}(i+1)$. The UE maintains two values of the power control adjustment state for the PUSCH transmission occasion (i+1): a first value $f_{b,f,c}(i+1)=f_{b,f,c}(i)+\delta_c$ and a second value $f_{b,f,c}(i+1)=f_{b,f,c}(i)$, wherein the first value is applied to determine the power in the PUSCH transmission occasion (i+1) and the second value is used to determine the power in PUSCH transmission occasions after transmission occasion (i+1). It is also possible that the UE updates the PUSCH power control adjustment state for the PUSCH transmission occasion (i+1) as $f_{b,f,c}(i+1)=f_{b,f,c}(i)+\delta_c$, and applies it to determine the power in the PUSCH transmission occasion (i+1) and to determine the power in PUSCH transmission occasions after transmission occasion (i+1). If TPC commands received in a DCI format 2_2 with CRC scrambled by TPC-PUSCH-RNTI after transmission occasion (i) and before transmission occasion (i+1), and subject to timing relationships for applicability to a next transmission occasion, wherein the next transmission occasion is (i+1), the UE applies the received TPC commands to update the PUSCH power control adjustment state for the PUSCH transmission occasion (i+1).

In slot (i+2) the UE can transmit a third PUSCH repetition with a power determined by applying the accumulated closed-loop power control adjustment state associated to the TPC-PUSCH-RNTI for the PUSCH transmission occasion (i), $f_{b,f,c}(i+2)=f_{b,f,c}(i)$, or the accumulated closed-loop power control adjustment state associated to the TPC-PUSCH-RNTI for the PUSCH transmission occasion i, $f_{b,f,c}(i)$, updated by the TPC command associated to the HARQ-ACK information transmitted in slot (i+1), which is $f_{b,f,c}(i+2)=f_{b,f,c}(i+1)$.

In slot (i+3) the UE transmits a fourth PUSCH repetition with a same power as the PUSCH transmission in transmission occasion (i+2) since no TPC commands are received between PUSCH transmission occasion (i+2) and PUSCH transmission occasion (i+3) and $f_{b,f,c}(i+3)=f_{b,f,c}(i+2)$. When $f_{b,f,c}(i+2)=f_{b,f,c}(i)$, the UE can restart DM-RS bundling after the slot where the HARQ-ACK is multiplexed and the actual DM-RS bundling window includes slots (i+2) and (i+3), as illustrated in FIG. 9. When $f_{b,f,c}(i+2)=f_{b,f,c}(i+1)$, the UE can restart DM-RS bundling from the slot where the HARQ-ACK is multiplexed and the actual DM-RS bundling window includes slots (i+1), (i+2) and (i+3), as illustrated in FIG. 10.

FIG. 11 illustrates an example method 1100 for a UE to determine a power for a PUSCH transmission when the UE is configured with DM-RS bundling operation and multiplexes an HARQ-ACK information in a PUSCH repetition according to embodiments of the present disclosure. The embodiment of the example method 1100 for a UE to determine a power for a PUSCH transmission when the UE is configured with DM-RS bundling operation and multiplexes an HARQ-ACK information in a PUSCH repetition illustrated in FIG. 11 is for illustration only. FIG. 11 does not limit the scope of this disclosure to any particular implementation of the example method for a UE to determine a power for a PUSCH transmission when the UE is configured with DM-RS bundling operation and multiplexes an HARQ-ACK information in a PUSCH repetition.

As illustrated in FIG. 11, at step 1110, a UE (such as the UE 116) is configured with PUSCH-DMRS-Bundling enabled and with PUSCH transmission with repetitions. At step 1120, the UE receives a DCI format that schedules an HARQ-ACK information in a first slot of the TDW. At step 1130, the UE transmits PUSCH repetitions in slots preceding the first slot within the TDW with a first power. At step 1140, the UE multiplexes the HARQ-ACK information in the PUSCH transmission in the first slot and transmits the PUSCH repetition with a second power. At step 1150, the UE transmits PUSCH repetitions in slots after the first slot within the TDW with a third power. Alternatively, to step 1150, the UE transmits PUSCH repetitions in slots after the first slot with the second power.

FIG. 12 illustrates an example method 1200 for a UE to determine a power for a PUSCH transmission when the UE multiplexes an HARQ-ACK information in a PUSCH repetition according to embodiments of the present disclosure. The embodiment of the example method 1200 for a UE to determine a power for a PUSCH transmission when the UE multiplexes an HARQ-ACK information in a PUSCH repetition illustrated in FIG. 12 is for illustration only. FIG. 12 does not limit the scope of this disclosure to any particular implementation of the example method for a UE to determine a power for a PUSCH transmission when the UE multiplexes an HARQ-ACK information in a PUSCH repetition.

As illustrated in FIG. 12, at step 1210, a UE (such as the UE 116) is configured/indicated to transmit a PUSCH with repetitions over a number of slots comprising a slot i. At step 1220, the UE receives a DCI format that schedules an HARQ-ACK information in the slot i and includes a first TPC command. At step 1230, the UE determines a first power based on the power control adjustment state associated to the TPC-PUSCH-RNTI for the PUSCH transmission in the slot i−1, TPC commands received within a first interval, if any, and the first TPC command. At step 1240, the UE determines a second power based on the power control adjustment state associated to the TPC-PUSCH-RNTI for the PUSCH transmission in the slot i−1, and TPC commands received within a first interval. At step 1250, the UE transmits the PUSCH in slot i with the first power and the PUSCH in slot i+1 with the second power. Alternatively, to step 1240 the UE updates the power control adjustment state in slot i based on the power control adjustment state in slot i−1, TPC commands received within a first interval, if any, and the first TPC command, and determines a second power based on the power control adjustment state in slot i and TPC commands received between slot i and slot i+1, if any. Then at step 1250, the UE transmit the PUSCH repetition in slot i+1 with the second power. In the above description the PUSCH repetition in slot i is equivalent to the PUSCH transmission in PUSCH transmission occasion i, and slot i and slot i+1 may or may not be consecutive slots. The steps of FIG. 12 also apply when the UE is configured with PUSCH-DMRS-Bundling enabled.

The above descriptions for determining a power of a PUSCH repetition that multiplexes an HARQ-ACK information and a power of a subsequent PUSCH repetition when PUSCH DM-RS bundling is enabled equally apply when PUSCH DM-RS bundling is not enabled. When a UE is configured to transmit a PUSCH with repetitions and PUSCH DM-RS bundling is not enabled, the power of the PUSCH repetition that multiplexes the HARQ-ACK information or generally a UCI may or may not be determined by applying a TPC command associated to the UCI, and a PUSCH transmit power control adjustment state may or may not be updated with the TPC command associated to the UCI. Whether to update the PUSCH transmit power control adjustment state with the TPC command associated to the UCI may be subject to a configuration. It may also depend on whether the PUSCH is a dynamic scheduled DG-PUSCH transmission or a semi-statically configured CG-PUSCH transmission.

A power for PUSCH, PUCCH and SRS transmissions is determined from corresponding uplink power control mechanisms for PUSCH, PUCCH and SRS. A UE maintains a closed-loop power control adjustment state associated to the reception of TPC commands in a DCI format with CRC scrambled by a TPC-PUSCH-RNTI for PUSCH transmissions, a closed-loop power control adjustment state associated to the reception of TPC commands in a DCI format with CRC scrambled by a TPC-PUCCH-RNTI for PUCCH transmissions, and a closed-loop power control adjustment state associated to SRS transmissions. The UE can be configured to maintain a closed-loop power control adjustment state for PUSCH and PUCCH transmissions, which can be also used for updating a closed-loop power control adjustment state for SRS transmissions. The power control adjustment state accumulates TPC commands that can be provided by a DCI format scheduling a PDSCH reception, or by a DCI format scheduling a PUSCH transmission, or by a DCI format scrambled by TPC-RNTI and not scheduling a PDSCH reception or a PUSCH transmission.

A PUSCH/PUCCH power control adjustment state $p_{b,f,c}(i)$ for active UL BWP b of carrier f of serving cell c in a PUSCH transmission occasion i can be updated with a TPC command value $\delta_{PUSCH,b,f,c}(i)$ included in a DCI format that schedules the PUSCH transmission occasion i on active UL BWP b of carrier f of serving cell c or jointly coded with other TPC commands in a DCI format 2_2 with CRC scrambled by TPC-PUSCH-RNTI, or in a PUCCH transmission occasion i can be updated with a TPC command $\delta_{PUCCH,b,f,c}(i)$ included in a DCI format associated with the PUCCH transmission for active UL BWP b of carrier f of the primary cell c that the UE detects for PUCCH transmission occasion i, or is jointly coded with other TPC commands in a DCI format 2_2 with CRC scrambled by TPC-PUCCH-RNTI, respectively. The power control adjustment state $p_{b,f,c}(i)$ can be used to determine the SRS power control adjustment state for active UL BWP b of carrier f of serving PUCCH transmission in transmission occasion i. The PUSCH/PUCCH power control adjustment state $p_{b,f,c}$ of a subsequent PUCCH transmission occasion j scheduled by a DCI format that includes a TPC command value $\delta_{PUSCH,b,f,c}(i)$, may or may not be updated with the TPC command value $\delta_{PUCCH,b,f,c}(i)$.

A UE can be provided a higher layer parameter tpc-PUSCH-PUCCH that enables and configures reception of group TPC commands for PUSCH and PUCCH or can be provided a higher layer parameter tpc-PUSCH-PUCCH-SRS that enables and configures reception of group TPC commands for PUSCH, PUCCH and SRS, wherein the higher layer parameter can be provided in Information Element (IE) PDCCH-Config. For example, parameter tpc-PUSCH-PUCCH can be provided as follows:

```
-- ASN1START
-- TAG-PDCCH-CONFIG-START
PDCCH-Config ::= SEQUENCE {
    ...,
    tpc-PUSCH        SetupRelease { PUSCH-TPC-CommandConfig } OPTIONAL, --
Need M
    tpc-PUCCH        SetupRelease { PUCCH-TPC-CommandConfig } OPTIONAL, --
Need M
    tpc-SRS        SetupRelease { SRS-TPC-CommandConfig}   OPTIONAL, -- Need M
        tpc-PUSCH-PUCCH SetupRelease { PUSCH-PUCCH-TPC-CommandConfig }
OPTIONAL, -- Need M
    ...,
}
...,
    -- TAG-PDCCH-CONFIG-STOP
-- ASN1STOP
``` cell c and SRS transmission occasion=i, $h_{b,f,c}(i)=p_{b,f,c}(i)$, where $p_{b,f,c}(i)$ is the current PUSCH/PUCCH power control adjustment state if srs-PowerControlAdjustmentStates indicates a same power control adjustment state for SRS transmissions and PUSCH transmissions.

It is also possible that the PUSCH/PUCCH power control adjustment state $p_{b,f,c}(n)$ for active UL BWP b of carrier f of serving cell c in a time instance n is updated with a TPC command value $\delta_{PUSCH,b,f,c}(n)$ that is jointly coded with other TPC commands in a DCI format 2_2 with CRC scrambled by TPC-PUSCH-RNTI or is updated with a TPC command value $\delta_{PUCCH,b,f,c}(n)$ that is jointly coded with other TPC commands in a DCI format 2_2 with CRC scrambled by TPC-PUCCH-RNTI.

In a PUSCH transmission occasion i, the UE updates the most recent PUSCH/PUCCH power control adjustment state $p_{b,f,c}$ with a TPC command value $\delta_{PUSCH,b,f,c}(i)$ included in a DCI format that schedules the PUSCH transmission occasion i on active UL BWP b of carrier f of serving cell c, if provided, and applies the updated adjustment state $p'_{b,f,c}(i)=p_{b,f,c}+\delta_{PUSCH,b,f,c}(i)$ to determine the power of the PUSCH transmission in transmission occasion i. The PUSCH/PUCCH power control adjustment state $p_{b,f,c}$ of a subsequent PUSCH transmission occasion j scheduled by a DCI format that includes a TPC command value $\delta_{PUSCH,b,f,c}(j)$, may or may not be updated with the TPC command value $\delta_{PUSCH,b,f,c}(i)$.

In a PUCCH transmission occasion i, the UE updates the most recent PUSCH/PUCCH power control adjustment state $p_{b,f,c}$ with a TPC command value $\delta_{PUCCH,b,f,c}(i)$ included in a DCI format that schedules the PUCCH transmission occasion i on active UL BWP b of carrier f of serving cell c, if provided, and applies the updated adjustment state $p'_{b,f,c}(i)=p_{b,f,c}+\delta_{PUCCH,b,f,c}(i)$ to determine the power of the Additionally, or alternatively, the UE can be provided a higher layer parameter for an RNTI used for PUSCH and PUCCH TPC commands on DCI. For example, a tpc-PUSCH-PUCCH-RNTI can be provided in IE PhysicalCell-GroupConfig which is used to configure cell-group specific L1 parameters. Additionally, or alternatively, the UE can be provided an IE PUSCH-PUCCH-TPC-CommandConfig that is used to configure the UE for extracting TPC commands for PUSCH and PUCCH from a group-TPC messages on DCI.

FIG. 13 illustrates an example method 1300 for a UE to determine a closed-loop power control adjustment state according to embodiments of the present disclosure. The embodiment of the example method 1300 for a UE to determine a closed-loop power control adjustment state illustrated in FIG. 13 is for illustration only. FIG. 13 does not limit the scope of this disclosure to any particular implementation of the example method for a UE to determine a closed-loop power control adjustment state.

As illustrated in FIG. 13, at step 1310, a UE (such as the UE 116) is configured a closed-loop power control for PUSCH and PUCCH. At step 1320, the UE accumulates TPC commands for PUSCH and PUCCH in a power control adjustment state $p_{b,f,c}(n)$ for active UL BWP b of carrier f of serving cell c. At step 1330, the UE receives a TPC command $\delta_{PUSCH,b,f,c}$ in a DCI format 2_2 with CRC scrambled by TPC-PUSCH-RNTI and updates the power control adjustment state $p_{b,f,c}(n+1)=p_{b,f,c}(n)+\delta_{PUSCH,b,f,c}$. At step 1340, the UE receives a TPC command $\delta_{PUCCH,b,f,c}$ in a DCI format 2_2 with CRC scrambled by TPC-PUCCH-RNTI and updates the power control adjustment state $p_{b,f,c}(n+2)=p_{b,f,c}(n+1)+\delta_{PUCCH,b,f,c}$.

FIG. 14 illustrates an example method 1400 for a UE to determine a power for transmission of a PUSCH based on a joint closed-loop power control for PUSCH and PUCCH according to embodiments of the present disclosure. The embodiment of the example method 1400 for a UE to determine a power for transmission of a PUSCH based on a joint closed-loop power control for PUSCH and PUCCH illustrated in FIG. 14 is for illustration only. FIG. 14 does not limit the scope of this disclosure to any particular implementation of the example method for a UE to determine a power for transmission of a PUSCH based on a joint closed-loop power control for PUSCH and PUCCH.

As illustrated in FIG. 14, at step 1410, a UE (such as the UE 116) is configured a closed-loop power control for PUSCH and PUCCH. At step 1420, the UE accumulates TPC commands for PUSCH and PUCCH in a power control adjustment state $p_{b,f,c}(n)$ for active UL BWP b of carrier f of serving cell c. At step 1430, the UE receives a TPC command $\delta_{PUSCH,b,f,c}$ in a DCI format that schedules a PUSCH transmission in transmission occasion i. At step 1440, the UE applies $p_{b,f,c}(n)+\delta_{PUSCH,b,f,c}(i)$ to determine a power for the PUSCH transmission in transmission occasion i. Additionally, the UE can update the power control adjustment state $p_{b,f,c}(i)=p_{b,f,c}(n)+\delta_{PUSCH,b,f,c}(i)$ of the closed-loop power control for PUSCH and PUCCH FIG. 15 illustrates an example method 1500 for a UE to determine a power for transmission of a PUCCH based on a joint closed-loop power control for PUSCH and PUCCH according to embodiments of the present disclosure. The embodiment of the example method 1500 for a UE to determine a power for transmission of a PUCCH based on a joint closed-loop power control for PUSCH and PUCCH illustrated in FIG. 15 is for illustration only. FIG. 15 does not limit the scope of this disclosure to any particular implementation of the example method for a UE to determine a power for transmission of a PUCCH based on a joint closed-loop power control for PUSCH and PUCCH.

As illustrated in FIG. 15, a UE (such as the UE 116) is configured a closed-loop power control for PUSCH and PUCCH 1510. At step 1520, the UE receives a TPC command in a DCI format with CRC scrambled by TPC-PUSCH-PUCCH-RNTI. At step 1530, the UE uses the received TPC command to update the power control adjustment state $p_{b,f,c}(n+1)=p_{b,f,c}(n)+\delta_{b,f,c}(i)$. At step 1540, the UE applies $p_{b,f,c}(n+1)$ to determine a power for the PUSCH transmission in transmission occasion i.

For the determination of a power for a PUSCH transmission with UCI information multiplexed in slot (i+1), whether to use the TPC command received in a DCI format associated to the UCI information can depend on the timing of the reception of the DCI format, or equivalently on the timing indicated by the DCI format associated with the UCI information, respect to the timing associated to the update of the PUSCH power control adjustment state that is applied to determine the power for the transmission of the PUSCH. It is also possible that when the UE multiplexes the UCI in a PUSCH transmission, the TPC command associated with the scheduling of the UCI is always used to update the PUSCH power control adjustment state that is applied to determine the power for the transmission of the PUSCH.

In the example of FIG. 10, $f_{b,f,c}(i+1)$ is the PUSCH power control adjustment state in a PUSCH transmission occasion i+1 which is determined by adding $f_{b,f,c}(i-i_0)$ and a sum of TPC command values that the UE receives in the interval $K_a$, and TPC command $\delta_a$. The transmission occasion $i_0$ is prior to reception of the TPC command $\delta_a$. The transmission occasion $i_0$ is prior to reception of the TPC command $\delta_a$. A UE may use the TPC command $\delta_c$ in the sum of TPC commands to calculate the value of $f_{b,f,c}(i+1)$ when the TPC command $\delta_c$ is received within the interval $K_a$, that is determined based on the reception of the DCI format that schedules the PUSCH transmission, and may not use it when it is received outside the interval $K_{a'}$. The interval over which the UE accumulates TPC commands that are used to calculate the power for the PUSCH transmission in transmission occasion (i+1), or equivalently the interval over which the UE updates the adjustment state used to calculate the power for the PUSCH transmission in transmission occasion (i+1), can be predefined, or provided by a higher layer parameter, or indicated in a DCI format, and can be the same for any of the transmission occasions of the PUSCH that is scheduled over multiple transmission occasions, as for example the interval $K_a$ in FIG. 10, or can be different, as for example $K_a$ and $K_{a'}$ for transmission occasion (i) and (i+1), respectively, in FIG. 10. Whether same or different time intervals are used for updating the adjustment state $f_{b,f,c}$ used to calculate the power for the PUSCH transmission in the different transmission occasions can be subject to a configuration.

For case a) of FIG. 10 the TPC command $\delta_c$ is not used to update the adjustment state for the PUSCH transmission occasion i+1, and the PUSCH power control adjustment state for the PUSCH transmission occasion i+1 which is determined by $f_{b,f,c}(i+1)=f_{b,f,c}(i-i_0)+\delta_a+\delta_b$.

For case b) of FIG. 10, the TPC command $\delta_c$ is used to update the adjustment state for the PUSCH transmission occasion i+1, and the PUSCH power control adjustment state for the PUSCH transmission occasion i+1 which is determined by $f_{b,f,c}(i+1)=f_{b,f,c}(i-i_0)+\delta_a+\delta_b+\delta_c$. The same power used for the PUSCH transmission in transmission occasion (i+1) can be used for the PUSCH transmission in transmission occasions after the transmission occasion (i+1). For PUSCH transmission in transmission occasions before transmission occasion (i+1), the power is based on the adjustment state without the accumulation of TPC command $\delta_c$. Thus, PUSCH transmissions in PUSCH transmission occasions prior to the transmission occasion for PUCCH or UCI can be transmitted with a power calculated from the power control adjustment state that does not include the TPC command $\delta_c$, and PUSCH transmissions in PUSCH transmission occasions after the transmission occasion for PUCCH or UCI can be transmitted with a power calculated from the power control adjustment state that includes the TPC command $\delta_c$, subject to the length of the time interval required for determining the transmission power based on the TPC command.

In both cases a) and b) the HARQ-ACK information is multiplexed in the PUSCH for the PUSCH transmission occasion i+1 regardless of the TPC command $\delta_c$ being used to update the adjustment state for the PUSCH transmission occasion i+1.

It is possible that when the UE multiplexes HARQ-ACK in a PUSCH transmission, the UE uses the TPC command $\delta_c$ to update the PUSCH power control adjustment state $f_{b,f,c}(i+1)$ regardless of the reception of the DCI format including the TPC command for HARQ-ACK transmission being within the interval to update the PUSCH power control adjustment state. It is also possible that the UE is not expected to multiplex a HARQ-ACK in a PUSCH transmission in a transmission occasion (i+1) when the TPC command $\delta_c$ associated to the HARQ-ACK is received outside the interval over which the UE accumulates TPC command to update the PUSCH power control adjustment state $f_{b,f,c}(i+1)$.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising
a transceiver configured to receive:
    information for:
        a first transmission occasion for a physical uplink shared channel (PUSCH), and
        a second transmission occasion for a physical uplink control channel (PUCCH),
    a first transmit power control (TPC) command, and
    information for a set of transmission occasions for the PUSCH that include transmission occasions before and after the second transmission occasion, wherein the set of transmission occasions is after the reception of the first TPC command by a first time interval that is not smaller than a second time interval required for determining a transmission power based on a TPC command; and
a processor operably coupled to the transceiver, the processor configured to determine:
    a first power control adjustment state based on the first TPC command,
    a first power for the PUSCH based on the first power control adjustment state, and
    a second power for the PUCCH based on the first power control adjustment state,
    wherein the transceiver is further configured to transmit:
        the PUSCH using the first power only in transmission occasions of the set of transmission occasions that are before the second transmission occasion, and
        the PUCCH in the second transmission occasion using the second power.

2. The UE of claim 1, wherein the first TPC command is provided by a downlink control information (DCI) format scheduling a physical downlink shared channel (PDSCH) reception.

3. The UE of claim 1, wherein the first TPC command is provided by a downlink control information (DCI) format scheduling a PUSCH transmission.

4. The UE of claim 1, wherein the first TPC command is provided by a downlink control information (DCI) format scrambled by a TPC radio network temporary identifier (TPC-RNTI) and wherein the DCI format does not schedule a physical downlink shared channel (PDSCH) reception or a PUSCH transmission.

5. The UE of claim 1, wherein:
    the transceiver is further configured to receive information for a third transmission occasion for a sounding reference signal (SRS);
    the processor is further configured to determine a third power for the SRS based on the first power control adjustment state; and
    the transceiver is further configured to transmit the SRS in the third transmission occasion with the third power.

6. The UE of claim 1, wherein:
    the transceiver is further configured to receive a second TPC command, wherein a transmission occasion from the set of transmission occasions is:
        after the second time interval from the reception of the second TPC command, and
        before the second transmission occasion;
    the processor is further configured to determine:
        a second power control adjustment state based on the second TPC command, and
        a third power based on the second power control adjustment state; and
    the transceiver is further configured to transmit the PUSCH using the third power in transmission occasions from the set of transmission occasions that are after the second transmission occasion.

7. A base station (BS) comprising
a transceiver configured to transmit:
    information for:
        a first reception occasion for a physical uplink shared channel (PUSCH), and
        a second reception occasion for a physical uplink control channel (PUCCH),
    a first transmit power control (TPC) command, and
    information for a set of reception occasions for the PUSCH that include reception occasions before and after the second reception occasion, wherein the set of reception occasions is after the transmission of the first TPC command by a first time interval that is not smaller than a second time interval required for determining a reception power based on a TPC command; and
a processor operably coupled to the transceiver, the processor configured to determine:
    a first power control adjustment state based on the first TPC command,
    a first power for the PUSCH based on the first power control adjustment state, and
    a second power for the PUCCH based on the first power control adjustment state,
    wherein the transceiver is further configured to receive:
        the PUSCH using the first power only in reception occasions of the set of reception occasions that are before the second reception occasion, and
        the PUCCH in the second reception occasion using the second power.

8. The BS of claim 7, wherein the first TPC command is provided by a downlink control information (DCI) format scheduling a physical downlink shared channel (PDSCH) transmission.

9. The BS of claim 7, wherein the first TPC command is provided by a downlink control information (DCI) format scrambled by a TPC radio network temporary identifier (TPC-RNTI) and wherein the DCI format does not schedule a physical downlink shared channel (PDSCH) transmission or a PUSCH reception.

10. The BS of claim 7, wherein:

the transceiver is further configured to transmit information for a third reception occasion for a sounding reference signal (SRS);

the processor is further configured to determine a third power for the SRS based on the first power control adjustment state; and the transceiver is further configured to receive the SRS in the third reception occasion with the third power.

11. The BS of claim 7, wherein:

the transceiver is further configured to transmit a second TPC command, wherein a reception occasion from the set of reception occasions is:

after the second time interval from the transmission of the second TPC command, and before the second reception occasion;

the processor is further configured to determine:

a second power control adjustment state based on the second TPC command, and a third power based on the second power control adjustment state; and the transceiver is further configured to receive the PUSCH using the third power in reception occasions from the set of reception occasions that are after the second reception occasion.

12. A method comprising:

receiving:

information for:

a first transmission occasion for a physical uplink shared channel (PUSCH), and a second transmission occasion for a physical uplink control channel (PUCCH), a first transmit power control (TPC) command; and information for a set of transmission occasions for the PUSCH that include transmission occasions before and after the second transmission occasion, wherein the set of transmission occasions is after the reception of the first TPC command by a first time interval that is not smaller than a second time interval required for determining a transmission power based on a TPC command;

determining:

a first power control adjustment state based on the first TPC command, a first power for the PUSCH based on the first power control adjustment state, and a second power for the PUCCH based on the first power control adjustment state; and transmitting:

the PUSCH using the first power only in transmission occasions of the set of transmission occasions that are before the second transmission occasion, and the PUCCH in the second transmission occasion using the second power.

13. The method of claim 12, wherein the first TPC command is provided by a downlink control information (DCI) format scheduling a physical downlink shared channel (PDSCH) reception.

14. The method of claim 12, wherein the first TPC command is provided by a downlink control information (DCI) format scheduling a PUSCH transmission.

15. The method of claim 12, wherein the first TPC command is provided by a downlink control information (DCI) format scrambled by a TPC radio network temporary identifier (TPC-RNTI) and wherein the DCI format does not schedule a physical downlink shared channel (PDSCH) reception or a PUSCH transmission.

16. The method of claim 12, further comprising:

receiving information for a third transmission occasion for a sounding reference signal (SRS);

determining a third power for the SRS based on the first power control adjustment state; and transmitting the SRS in the third transmission occasion with the third power.

17. The method of claim 12, further comprising:

receiving a second TPC command, wherein a transmission occasion from the set of transmission occasions is:

after the second time interval from the reception of the second TPC command, and before the second transmission occasion;

determining:

a second power control adjustment state based on the second TPC command, and a third power based on the second power control adjustment state; and transmitting the PUSCH using the third power in transmission occasions from the set of transmission occasions that are after the second transmission occasion.

* * * * *